United States Patent [19]

Arakawa

[11] Patent Number: 5,398,307
[45] Date of Patent: Mar. 14, 1995

[54] MESH GENERATING METHOD AND APPARATUS THEREFOR

[75] Inventor: Yoshiki Arakawa, Hyogo, Japan

[73] Assignee: Matsushita Electric Industrial Co., Ltd., Osaka, Japan

[21] Appl. No.: 206,280

[22] Filed: Mar. 7, 1994

Related U.S. Application Data

[63] Continuation-in-part of Ser. No. 725,663, Jul. 3, 1991, abandoned.

[30] Foreign Application Priority Data

Jul. 6, 1990 [JP] Japan .................................. 2-180056

[51] Int. Cl.⁶ .............................................. G06F 15/72
[52] U.S. Cl. ..................................................... 395/123
[58] Field of Search ........................ 395/120, 123, 141; 364/564, 565

[56] References Cited

U.S. PATENT DOCUMENTS

| | | | |
|---|---|---|---|
| 4,766,556 | 8/1988 | Arakawa | 340/729 X |
| 4,791,579 | 12/1988 | Kranitzky | 395/120 |
| 4,893,260 | 1/1990 | Arakawa | 364/564 |
| 4,912,664 | 3/1990 | Weiss et al. | 395/123 X |
| 4,930,092 | 5/1990 | Reilly | 395/123 |
| 4,941,114 | 7/1990 | Shigyo et al. | 395/123 X |
| 5,010,501 | 4/1991 | Arakawa | 395/120 |
| 5,159,643 | 10/1992 | Kaga et al. | 364/564 X |
| 5,214,752 | 5/1993 | Meshkat et al. | 395/123 |
| 5,307,450 | 4/1994 | Grossman | 395/123 |

FOREIGN PATENT DOCUMENTS 62-1075 1/1987 Japan .
63-177270 7/1988 Japan .

Primary Examiner—Mark K. Zimmerman
Attorney, Agent, or Firm—Wenderoth, Lind & Ponack

[57] ABSTRACT

A mesh generating method and a mesh generating apparatus are for automating the division of a space necessary in a numerical analysis. Firstly, a three-dimensional configuration of an object is formed by three-dimensional run-length data in a first graphic processing device, and the run-length data is stored in a run-length data storing device. In a second graphic processing device, the run-length data is sequentially read out from the storing device, calculations of the run-length data is performed, sectional configuration data is generated, and the sectional configuration data is stored in a device for storing the sectional configuration data. In third graphic processing device, the sectional configuration data is sequentially read out from the device for storing the sectional configuration data, calculations of the sectional configuration data is performed, at least one of data of an area of a section, center of gravity thereof, and number of boundary lines thereof each indicating characteristic of sectional configuration of the section is generated, and the generated data is stored in a device for storing the data indicating the characteristic of the sectional configuration. In a fourth graphic processing device, the data indicating the characteristic of the sectional configuration is sequentially read out from the device for storing the data indicating the characteristic of the sectional configuration, calculations of the data is performed, mesh plane data is generated, and the mesh plane data is stored in a mesh data storing device.

8 Claims, 19 Drawing Sheets

Fig. 3
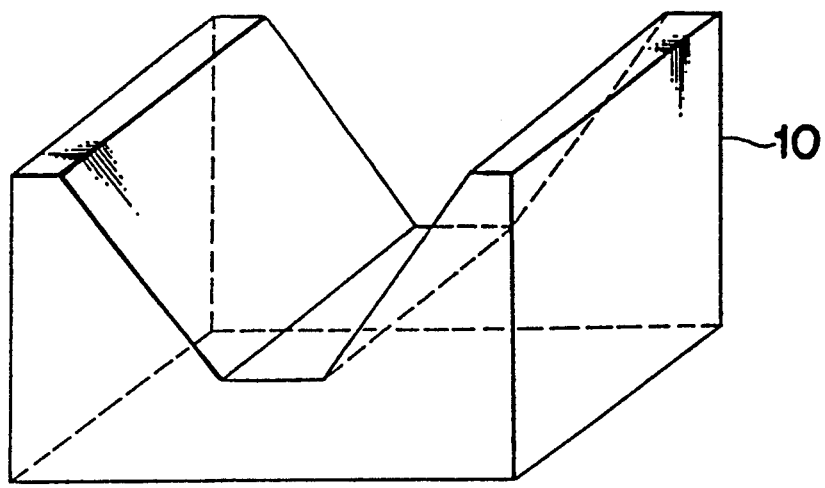
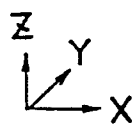
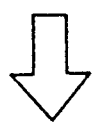
SECT.
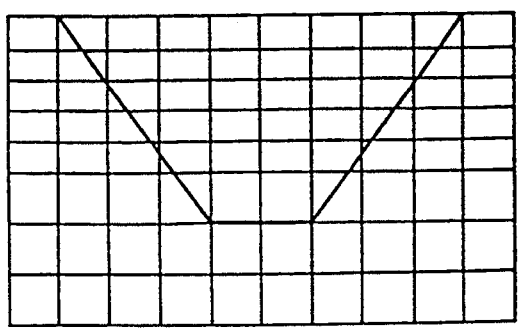

Fig. 8

| 0 | S | ( $x_g$ , $y_g$ ) | $n_b$ |
|---|---|---|---|
| 1 | | | |
| ⋮ | ⋮ | ⋮ | ⋮ |
| $x_{max}$ | | | |
| 0 | S | ( $x_g$ , $y_g$ ) | $n_b$ |
| 1 | | | |
| ⋮ | ⋮ | ⋮ | ⋮ |
| $y_{max}$ | | | |
| 0 | S | ( $x_g$ , $y_g$ ) | $n_b$ |
| 1 | | | |
| ⋮ | ⋮ | ⋮ | ⋮ |
| $z_{max}$ | | | |

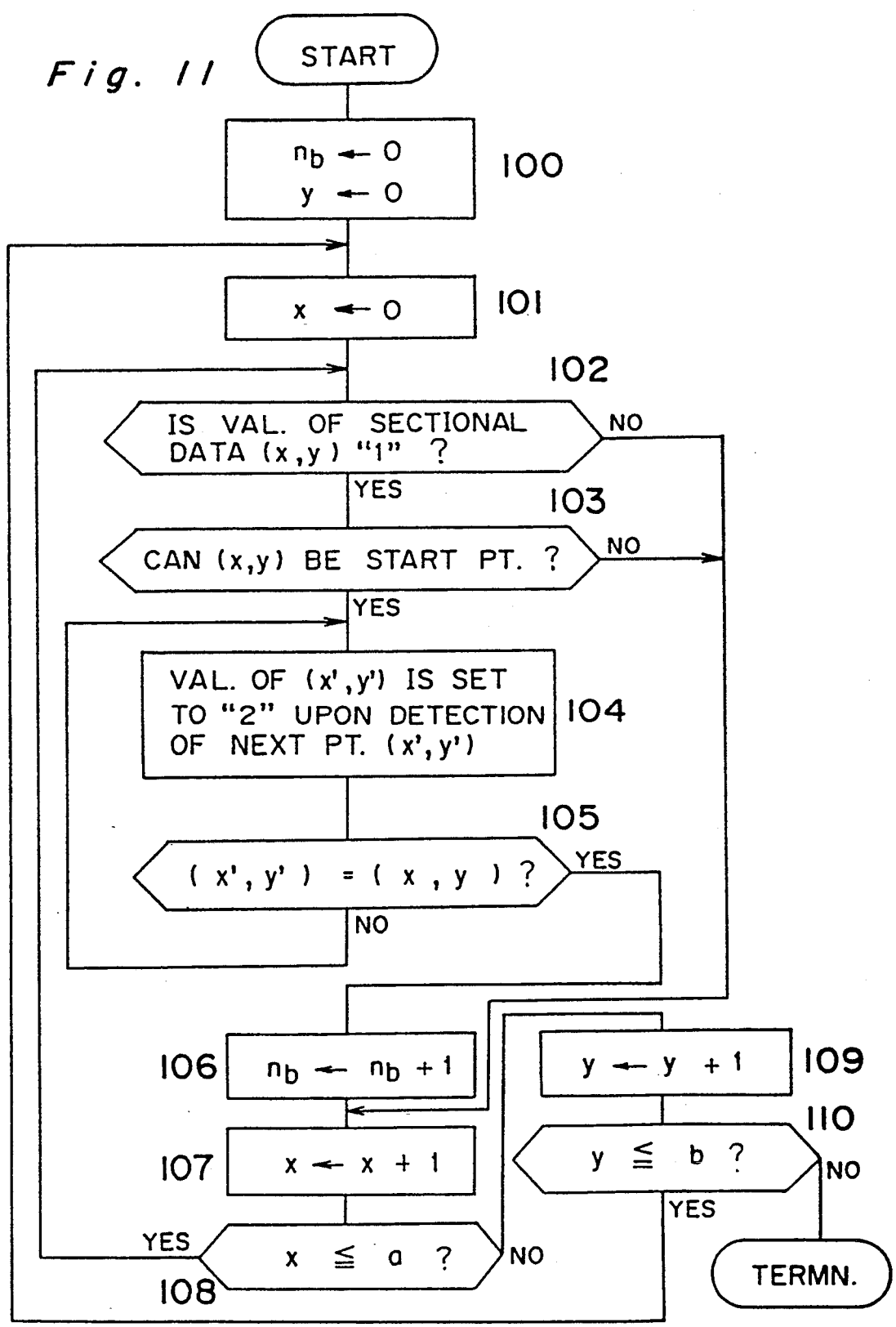

Fig. 16

| | |
|---|---|
| 1 | X-COORD. OF MESH IN X-SECT. |
| 2 | X-COORD. OF MESH IN X-SECT. |
| ⋮ | ⋮ |
| $n_x$ | X-COORD. OF MESH IN X-SECT. |
| 1 | Y-COORD. OF MESH IN Y-SECT. |
| 2 | Y-COORD. OF MESH IN Y-SECT. |
| ⋮ | ⋮ |
| $n_y$ | Y-COORD. OF MESH IN Y-SECT. |
| 1 | Z-COORD. OF MESH IN Z-SECT. |
| 2 | Z-COORD. OF MESH IN Z-SECT. |
| ⋮ | ⋮ |
| $n_z$ | Z-COORD. OF MESH IN Z-SECT. |

Fig. 18C
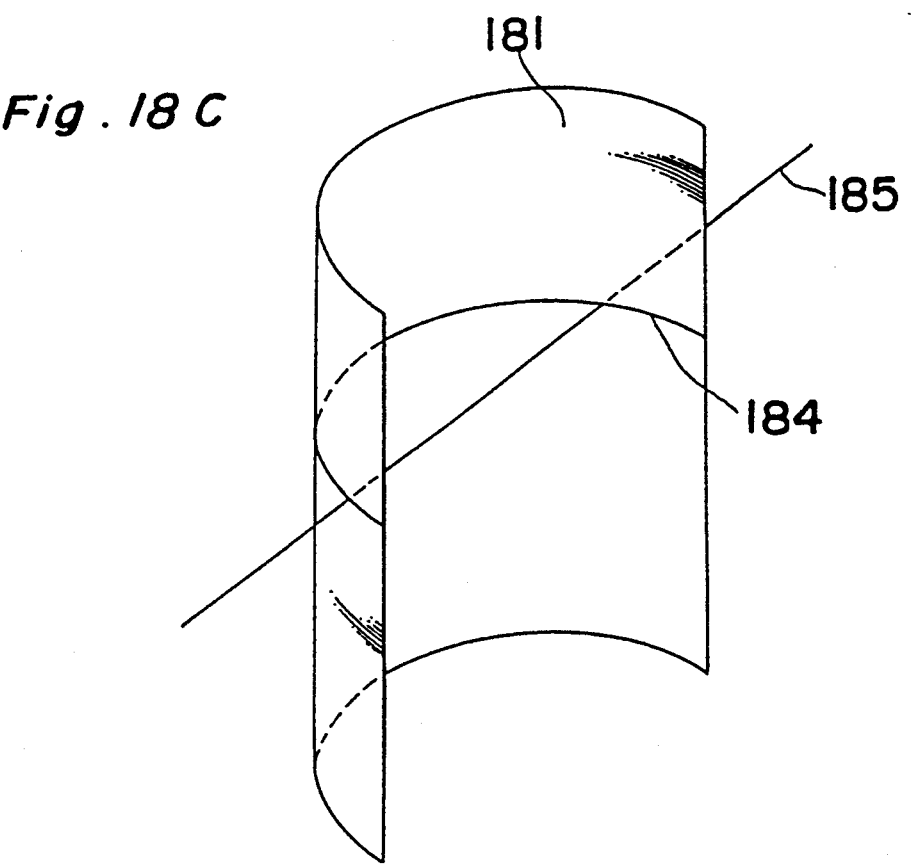
Fig. 18D
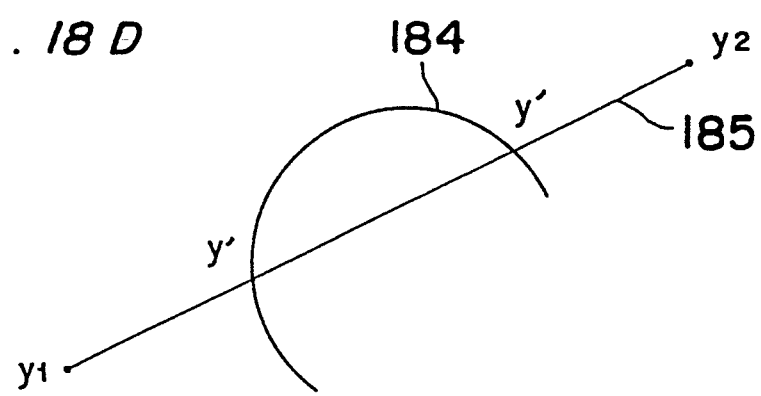
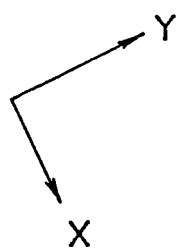

MESH GENERATING METHOD AND APPARATUS THEREFOR

This is a continuation in part of application Ser. No. 07/725,663, filed Jul. 3, 1991, abandoned.

BACKGROUND OF THE INVENTION

The present invention relates to a mesh generation method for automating the division of a space necessary in a numerical analysis and in particular a fluid analysis performed by using a computer and an apparatus therefor.

A fluid analyzing operation using calculus of finite differences is performed in the following procedure:

[Procedure 1]

As shown in FIG. 2A, the configuration of a three-dimensional solid object 10 which is an obstruction in a space to be analyzed is defined in some form.

[Procedure 2]

As shown in FIG. 2B, the space is mesh-divided (lattice-divided) 11 at an appropriate interval in consideration of the characteristic of the configuration of the three-dimensional object 10.

[Procedure 3]

Then, how much each cell 11 generated by the mesh-division includes the configuration of the object 10 is found. That is, more specifically, the ratio of the volume of the three-dimensional object 10 to each cell 11 and the ratio of the area of each face of the three-dimensional object 10 to each face 12, 13, 14 of the cell 11 is calculated. In an example shown in FIG. 2, since the space is mesh-divided in rectangular coordinate, the cell 11 is a rectangular solid as shown in FIG. 2C.

[Procedure 4]

Data indicating the condition (boundary) of the three-dimensional object 10 necessary for the analysis is generated.

[Procedure 5]

Preparatory operations for the analysis are performed as described above. The program of the fluid analysis is executed to perform the analysis based on the data of the configuration of the three-dimensional object, the data of mesh-division, the above-described ratios of the volume and area of the three-dimensional object, and the data of the boundary.

Procedures 1 through 5 are repeatedly performed until a satisfactory result is obtained.

The fluid analysis is performed as described above. Tools called a pre-processor for performing procedures 1, 3, and 4 automatically and efficiently have been developed or proposed. The applicant proposed such a tool in Japanese Laid-Open Patent Publication No. 63-177270 and U.S. Pat. No. 4,893,260 which refers to the aforementioned publication.

However, a method for efficiently performing procedure 2, namely, a method for generating meshes automatically or efficiently and an apparatus for carrying the method have not been proposed.

Conventionally, appropriate mesh data is manually generated by forming a drawing such as a sectional view of a three-dimensional object as shown in FIG. 3. It takes much time and labor and difficult to generate appropriate meshes by a manual operation if the configuration of a three-dimensional solid object is complicated.

SUMMARY OF THE INVENTION

Accordingly, it is an essential object of the present invention to provide a method for automatically and efficiently generating appropriate meshes irrespective of the configuration of a solid object, for example, three-dimensional configuration and an apparatus for carrying out the method.

In accomplishing these and other objects of the present invention, there is provided a method and an apparatus for generating meshes comprising the steps of:

forming a three-dimensional configuration of an object by three-dimensional run-length data, and storing the run-length data in a run-length data storing device;

sequentially reading out the run-length data from the storing device, performing calculations of the run-length data, generating sectional configuration data, and storing the sectional configuration data in a device for storing the sectional configuration data;

sequentially reading out the sectional configuration data from the device for storing the sectional configuration data, performing calculations of the sectional configuration data, generating at least one of data of an area of a section, center of gravity thereof, and number of boundary lines thereof each indicating characteristic of sectional configuration of the section, and storing the generated data in a device for storing the data indicating the characteristic of the sectional configuration; and sequentially reading out the data indicating the characteristic of the sectional configuration from the device for storing the data indicating the characteristic of the sectional configuration, performing calculations of the data, generating mesh plane data, and storing the mesh plane data in a mesh data storing device.

According to another aspect of the present invention, there is provided a mesh generating method comprising the steps of:

forming a two-dimensional configuration of an object by two-dimensional run-length data, and storing the run-length data in a run-length data storing device;

sequentially reading out the run-length data from the storing device, performing calculations of the run-length data, generating sectional configuration data, and storing the sectional configuration data in a device for storing the sectional configuration data;

sequentially reading out the sectional configuration data from the device for storing the sectional configuration data, performing calculations of the sectional configuration data, generating at least one of data of an area of a section, center of gravity thereof, and number of boundary lines thereof each indicating characteristic of sectional configuration of the section, and storing the generated data in a device for storing the data indicating the characteristic of the sectional configuration; and sequentially reading out the data indicating the characteristic of the sectional configuration from the device for storing the data indicating the characteristic of the sectional configuration, performing calculations of the data, generating mesh plane data, and storing the mesh plane data in a mesh data storing device.

The method and apparatus for expressing and processing the configuration of a three-dimensional solid object in three-dimensional run-length data is described in detail in Japanese Laid-open Patent Publication No. 62-1075 and U.S. Pat. No. 4,766,556 which refers to the aforementioned publication.

BRIEF DESCRIPTION OF THE DRAWINGS

These and other objects and features of the present invention will become apparent from the following description taken in conjunction with the preferred embodiments thereof with reference to the accompanying drawings, in which:

FIG. 3 is a descriptive view for describing a method for generating meshes according to a conventional art;

FIG. 8 is a structure view showing data of the characteristic of each sectional configuration according to the embodiment of the present invention;

FIG. 11 is a flowchart for finding a boundary line and the number of boundary lines according to the embodiment of the present invention;

FIG. 16 is a structure view showing the structure of the mesh data according to the embodiment of the present invention;

DETAILED DESCRIPTION OF THE INVENTION

Figure 1:
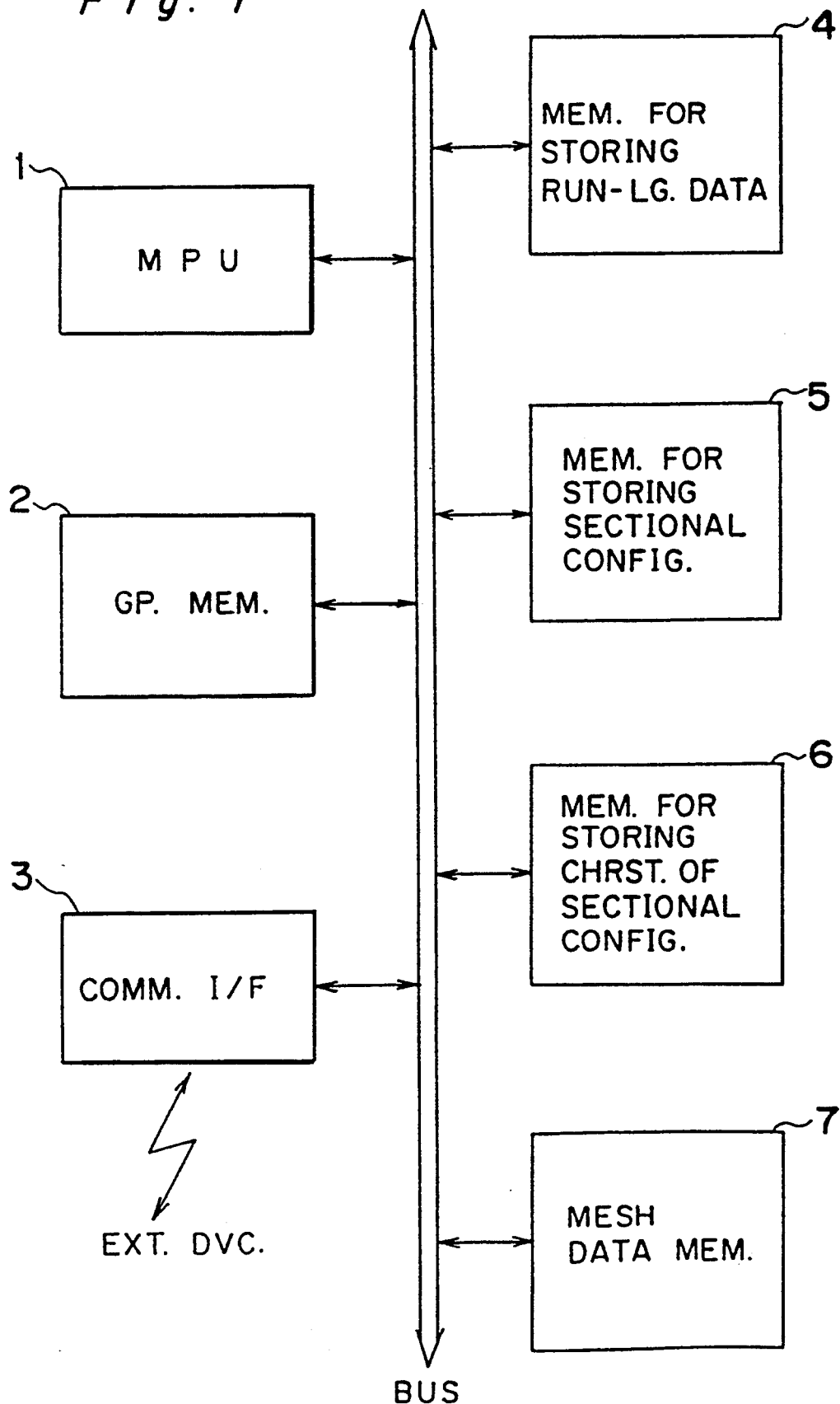
FIG. 1 is an entire structure view according to a first embodiment of the present invention.

Before the description of the present invention proceeds, it is to be noted that like parts are designated by like reference numerals throughout the accompanying drawings.

A first embodiment of the present invention will be described below with reference the drawings. Meshes are generated in rectangular coordinate in the first embodiment.

As shown in FIG. 1, an apparatus for carrying out the method according to the first embodiment of the present invention comprises a microprocessor unit MPU 1 for performing graphic processing calculations; a general-purpose memory 2 for temporarily storing intermediate data generated during graphic processing calculations; a communication interface 3 for receiving run-length data, namely, data defining the configuration of a three-dimensional solid object sent from an external device such as an external computer and transmitting mesh data produced by the apparatus of the first embodiment to the external device; a run-length data memory 4 for storing the run-length data transmitted from the external device; a memory 5 for storing sectional configuration data, in the form of pixel, generated based on the run-length data; a memory 6 for storing data indicating the characteristic of each sectional configuration generated based on sectional configuration data; and a mesh data memory 7 for storing mesh data.

The function of the above apparatus is described in detail below.

First, the method for generating the data indicating the sectional configuration of the three-dimensional object.

According to the first embodiment, run-length data is in Y-direction. Since meshes are generated in rectangular coordinate in the first embodiment, sections perpendicular to X-axis, Y-axis, and Z-axis each referred to as X-section, Y-section, and Z-section are found. A space to be analyzed is a rectangular three-dimensional object in which the vertices are represented as $(0, 0, 0)$-$(X^{max}, Y_{max}, Z_{max})$ to be generalized. Accordingly, it is necessary to find all sectional views in X-section, Y-section, and Z-section in the following range: $0 \leq x \leq x_{max}$, $0 \leq y \leq y_{max}$, $0 \leq z \leq z_{max}$, respectively. Mathematically, values for x, y, and z are innumerable in each range. But since the sectional configuration of the three-dimensional object is expressed in run-length data, it is unnecessary to use values for x, y, and z less than the resolution of the run-length data in order to find sectional views of the three-dimensional object. Therefore, the unit value $\Delta x$, $\Delta y$, $\Delta z$ of x, y, z can all be set to "1".

Figure 5:
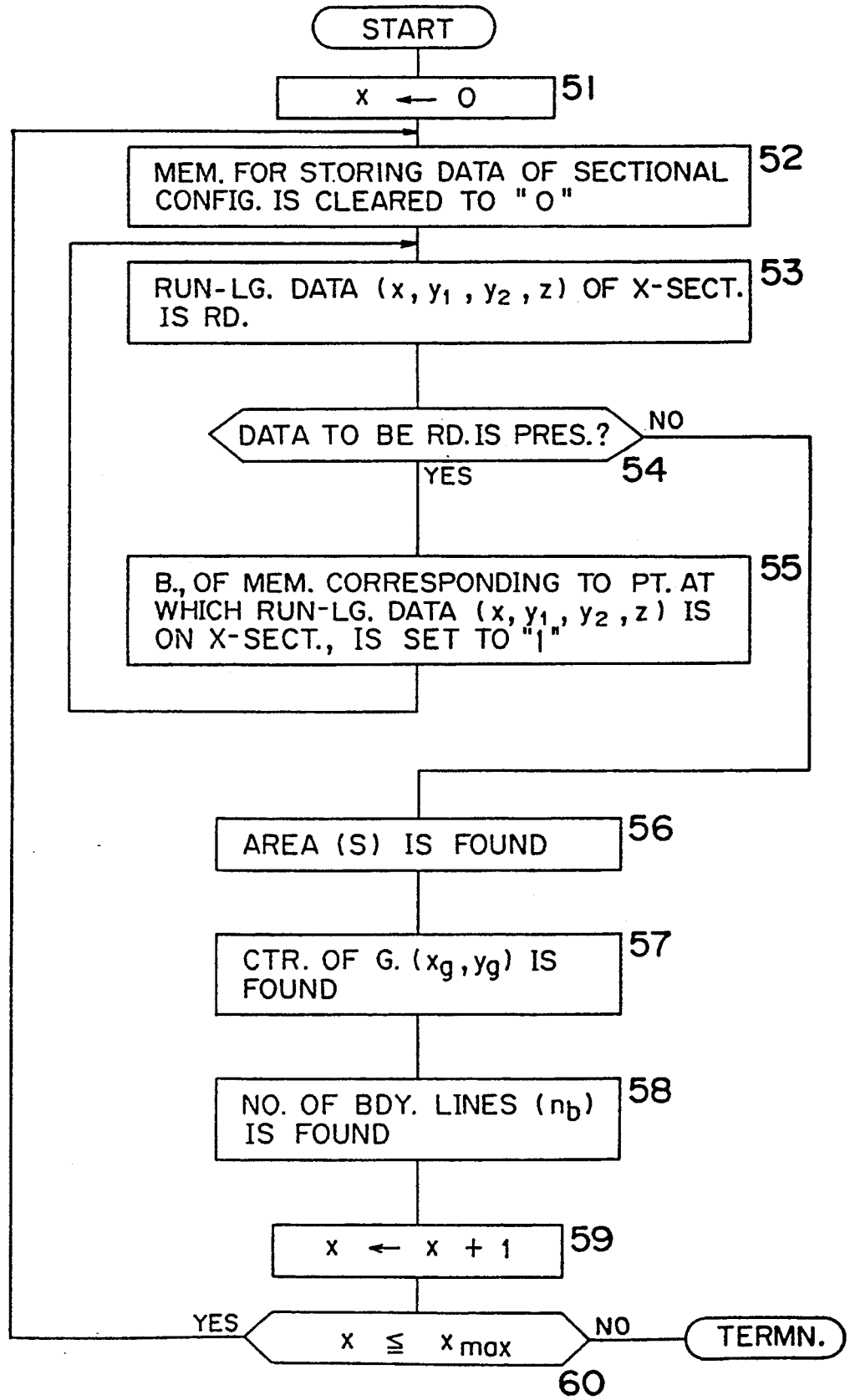
FIG. 5 is a flowchart for finding data of each sectional configuration and data of the characteristic of each sectional configuration according to the embodiment of the present invention.

Using the flowchart of FIG. 5, the method for finding the X-section of the three-dimensional object is described below.

The range of the value for (x) in X-section is $0 \leq x \leq x_{max}$. Therefore, at step 51, the value for (x) in an x-section is initialized to "0". At step 52, the memory 5 for storing data of sectional configuration is cleared to "0". At step 53, according to the instruction of the MPU 1, run-length data (x, y$_1$, y$_2$, z) of an x-section are sequentially read out from the run-length data memory 4. At step 54, it is decided whether or not data to be read is present and then when the data is present, the program goes to step 55. When the data is not present, the program goes to step 56. At step 55, the MPU 1 sets the bit, of the memory 5 corresponding to the point at which the run-length data (x, y$_1$, y$_2$, z) is on the x-section, to "1". Then the program returns to step 53.

Figures 6, 7:
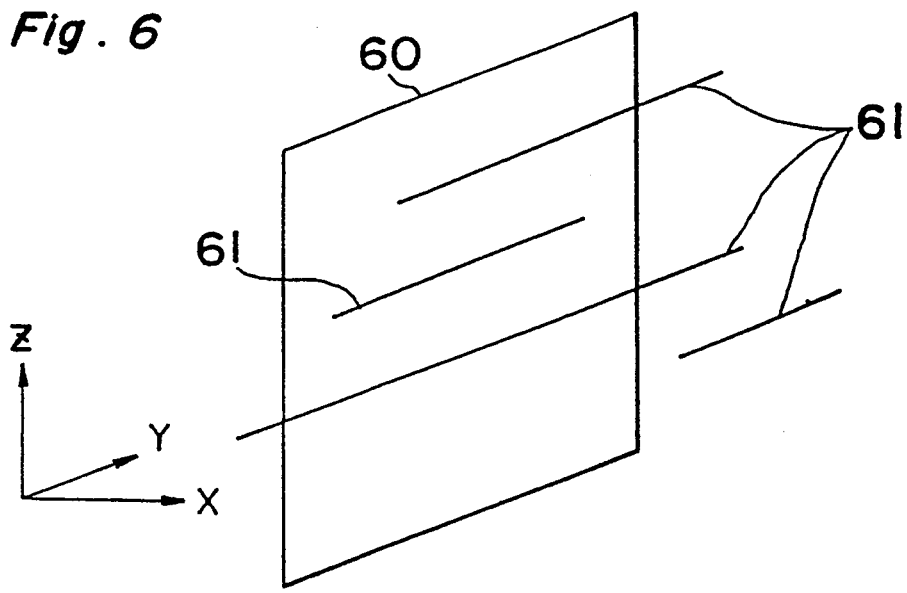
FIG. 6 is a descriptive view for describing the relationship between a section and run-length data according to the embodiment of the present invention.
FIG. 7 is a structure view showing data of each sectional configuration according to the embodiment of the present invention.

As shown in FIG. 6, since the run-length data is in Y-axis, run-length data (line) 61 is partially or entirely included in an x-section 60 supposing that the run-length data 61 is on the section 60. It can be very easily decided whether or not the run-length data 61 is on the section 60. It is decided at steps 53 through 55 whether or not each run-length data is on the x-section with respect to all run-length data on the x-section. Thus, the sectional view of the three-dimensional object in the x-section is completed.

The memory 5 for storing the data of sectional configuration has a bit map (pixel) structure as shown in FIG. 7. In the case of the X-section, $$(a, b) = (y_{max}, z_{max}) \tag{1}$$

Then, the MPU 1 finds the area (S) of X-section at step 56, the center of gravity (x$_g$, y$_g$) of X-section at step 57, and the number (n$_b$) of boundary lines of X-section at step 58 according to the memory 5. The data thus produced are stored in the memory 6 for storing data of characteristic of sectional configuration.

Processings are executed at steps 52 through 59 for each in the above-described range, $0 \leq x \leq x_{max}$ at step 60.

The sectional configurations of the three-dimensional object in Y-section and Z-section are respectively found by executing a similar processings in Y-section and Z-section in the ranges of: $0 \leq y \leq y_{max}$, $0 \leq z \leq z_{max}$. In order to obtain the sectional configurations of the three-dimensional object in Y-section, it is necessary to find intersections of each Y-section ($0 \leq y \leq y_{max}$) and run-length data, which process is very easy.

Figure 8:
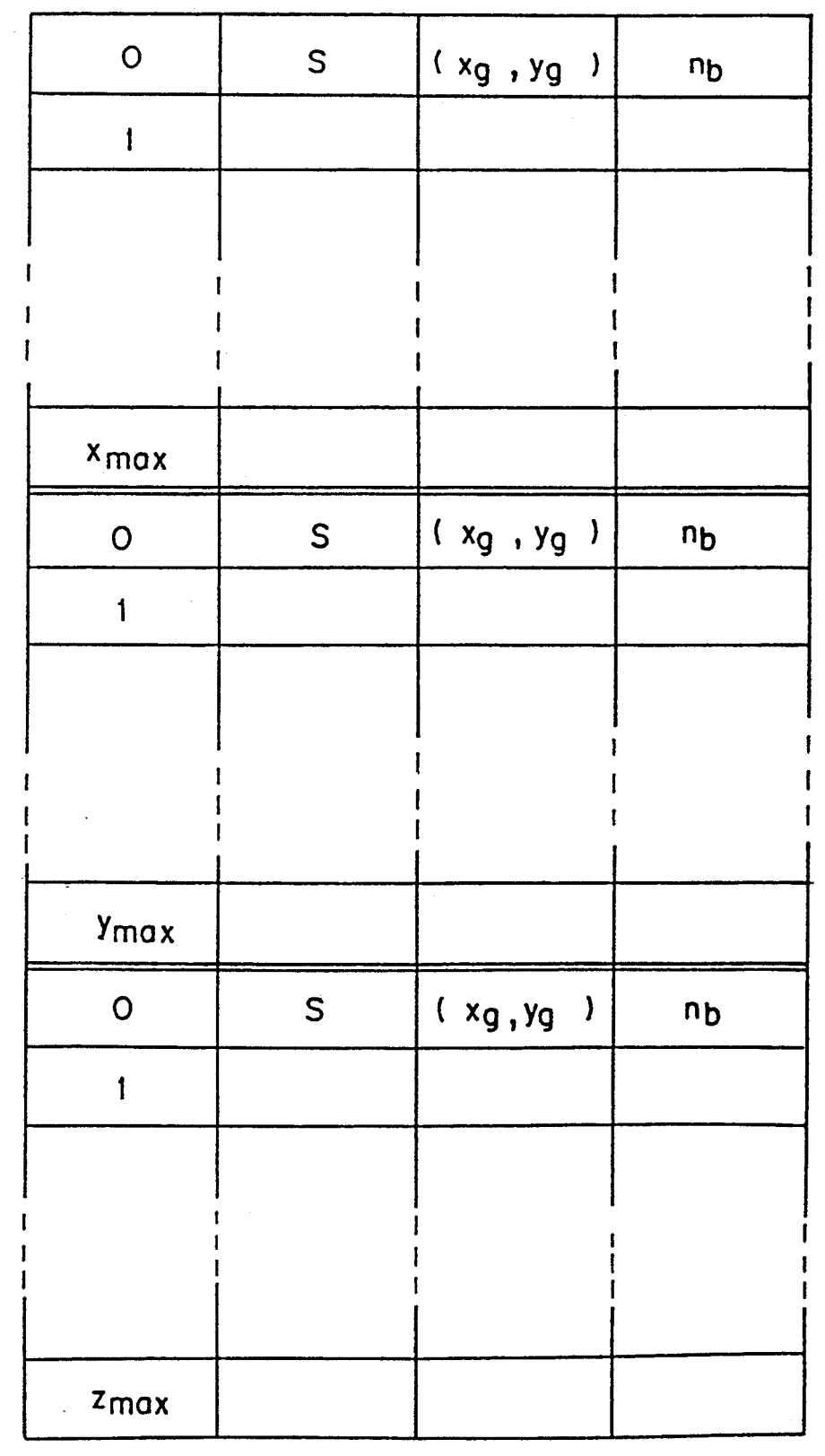

The structure of the memory 6 is as shown in FIG. 8.

The processing for finding the sectional area (S) of a section of the object, the center of gravity (x$_g$, y$_g$) thereof, and the number (n$_b$) of boundary lines thereof is described in detail below.

The sectional area (S) can be calculated very easily by counting the number of pixels (bits), of the memory 5, the value of which is "1".

The processing for finding the center of gravity (x$_g$, y$_g$) is described below. The center of gravity (x$_g$, y$_g$) of a two-dimensional figure can be found by the following equation.

$$(x_g, y_g) = \left( \frac{\Sigma \Delta Sx}{S}, \frac{\Sigma \Delta Sy}{S} \right) \tag{2}$$

where $\Delta S$ is the area of a infinitesimal plane; x and y are X-coordinate and Y-coordinate of the center of gravity of each infinitesimal plane; and S is the whole sectional area, namely, $S = \Sigma \Delta S$.

According to the first embodiment, since the data indicating the sectional configuration of the object is in the form of bit map data, $\Delta S$ can be set to "1".

Figure 9:
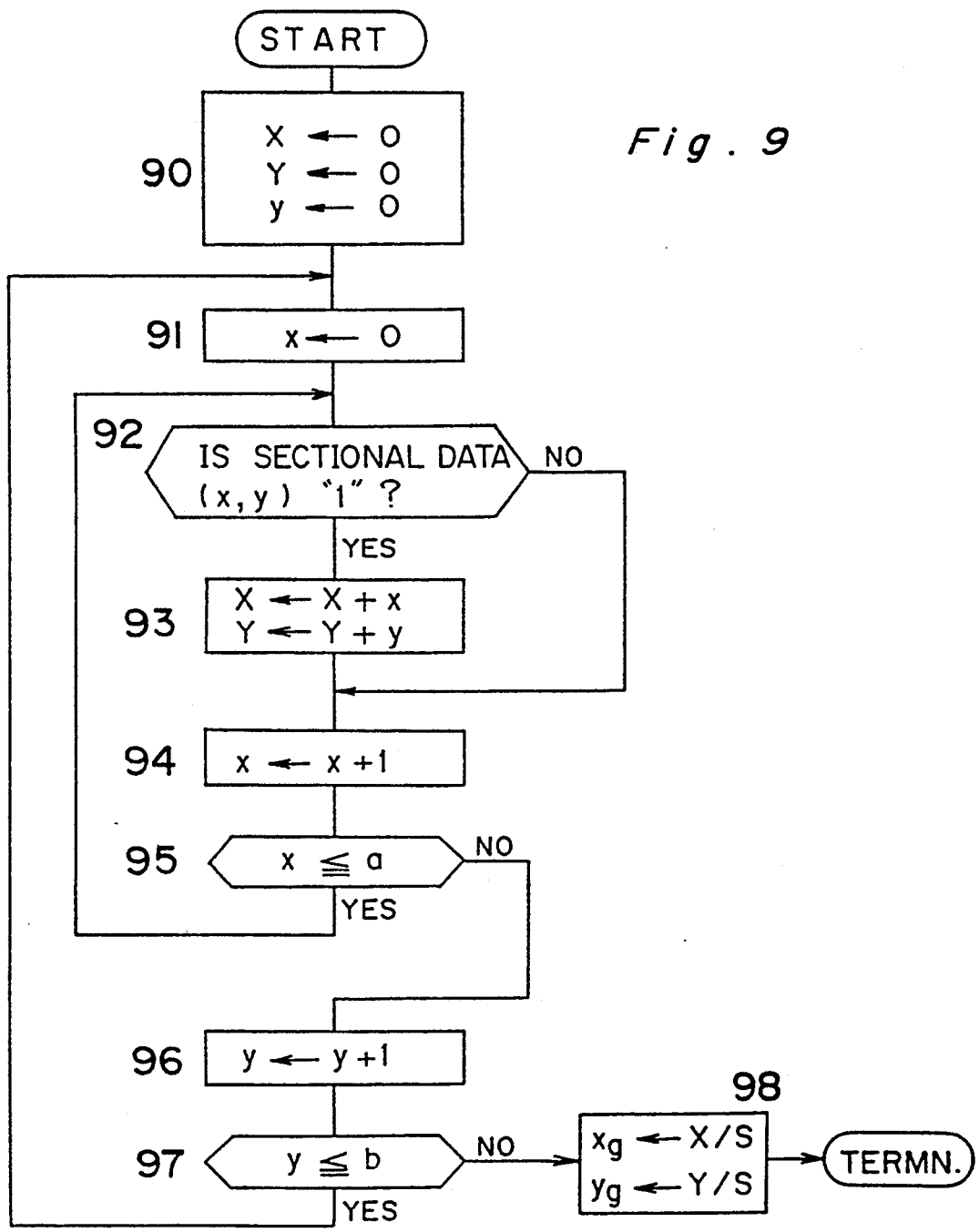
FIG. 9 is a flowchart for finding the center of gravity of each section according to the embodiment of the present invention.

The processing for finding the center of gravity of a section is described in detail below referring to the flowchart shown in FIG. 9.

First, the coordinate of an operation area (X, Y) and the coordinate (x, y) of the data indicating sectional configuration are initialized to "0" at steps 90 and 91, respectively. Then, according to the instruction of the MPU 1, data indicating sectional configuration are sequentially read out from the memory 5 and it is decided at step 92 whether the bit of the data of the coordinate (x, y) is "0" or "1". If it is decided that the bit is not "1", the program goes to step 94. If it is decided that the bit is "1", i.e., if the object has a configuration at the coordinate (x, y), the coordinate (x, y) is added to (X), (Y), respectively at step 93. Then at step 94, "1" is added to (x) and it is decided whether or not (x) is equal to or less than (a) at step 95. If yes, the program returns to step 92. If no, the program goes to step 96. At step 96, "1" is added to (y) and at step 97 it is decided whether or not (y) is equal to or less than (b). If yes, the program returns to step 91. If no, the program goes to step 98. Finally, the calculated (X) and (Y) are divided by (S), and each resulting value is substituted into x$_g$, y$_g$, respectively at step 98.

The processing for finding the number of boundary lines in the data indicating sectional configuration is described in detail below.

Figure 10:
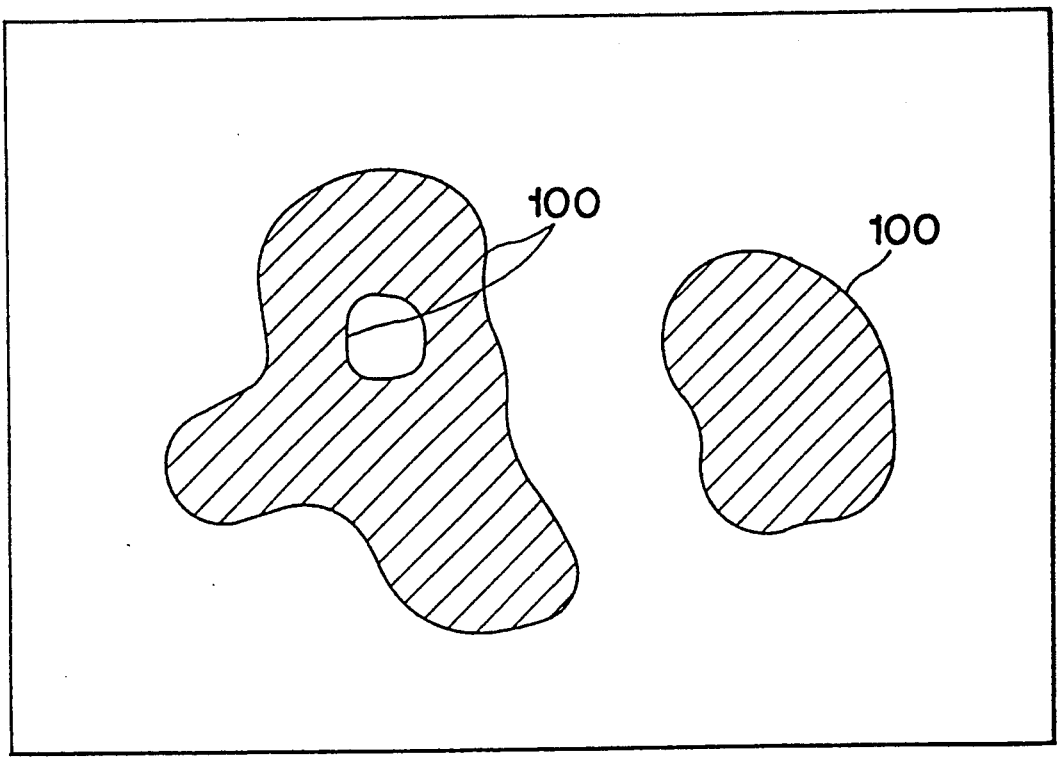
FIG. 10 is a descriptive view for describing boundary lines in sections according to the embodiment of the present invention.

The number of boundary lines is obtained by finding the number of closed boundary lines 100 as shown in FIG. 10. A boundary line can be easily detected by sequentially finding points at which the bit changes from "0" to "1" or from "1" to "0".

Referring to the flowchart shown in FIG. 11, the processing for detecting boundary lines 100 in the sectional view and calculating the number of boundary lines 100 is described below in detail.

Figure 12A:
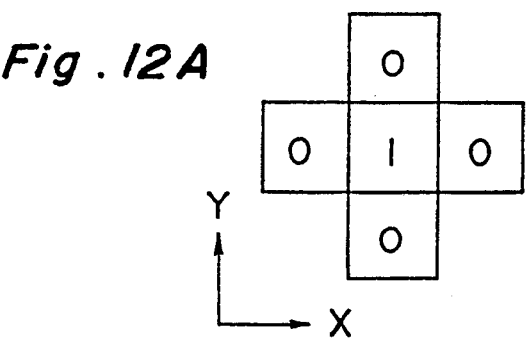
FIGS. 12A-12Q are descriptive views showing various patterns of the start point of a boundary line.
Figure 12B:
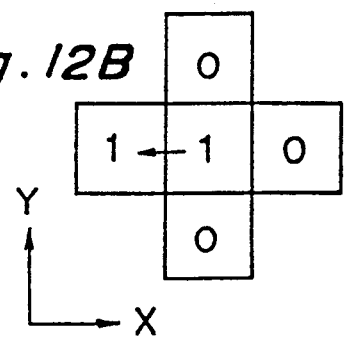
Figure 12C:
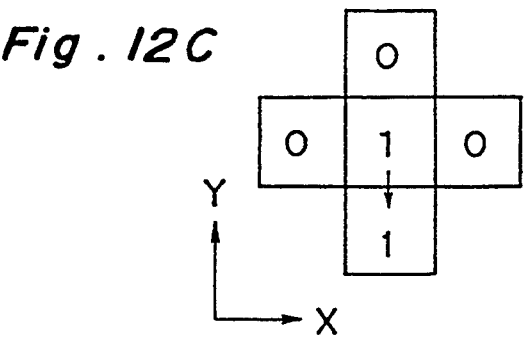
Figure 12D:
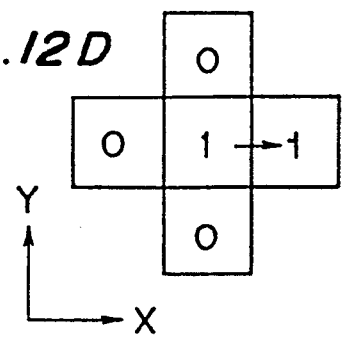
Figure 12E:
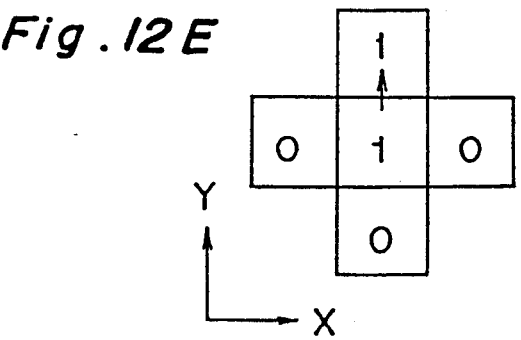
Figure 12F:
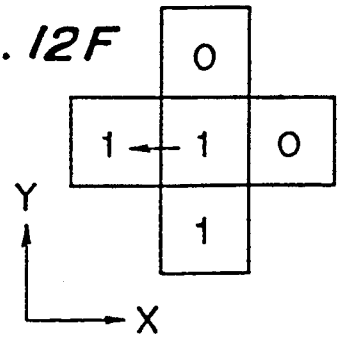
Figure 12G:
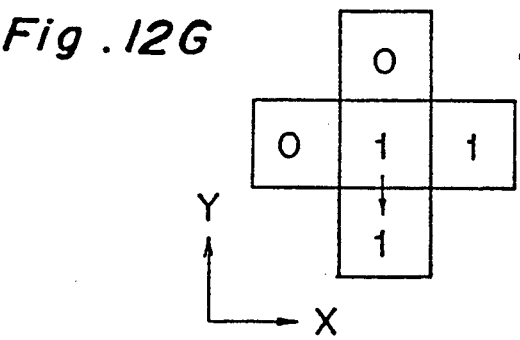
Figure 12H:
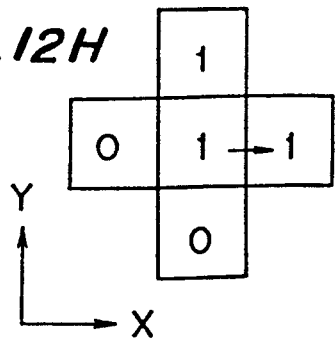
Figure 12I:
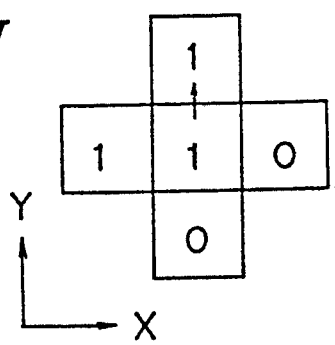
Figure 12J:
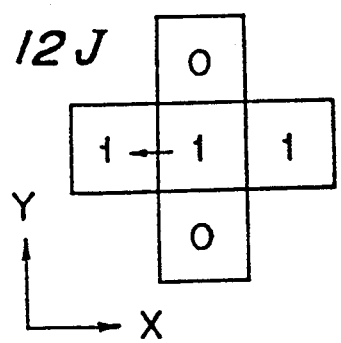
Figure 12K:
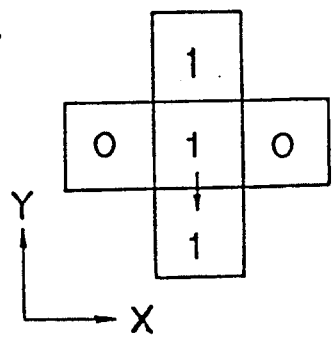
Figure 12L:
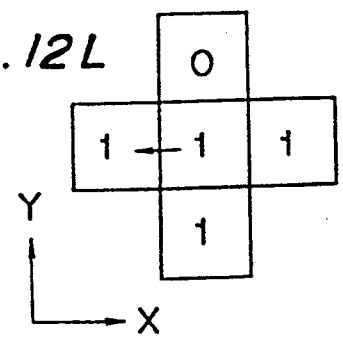
Figure 12M:
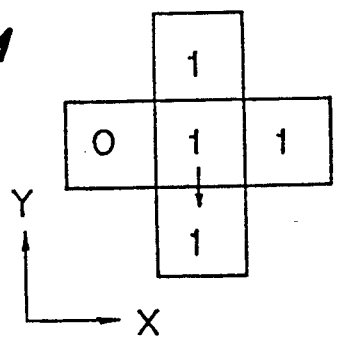
Figure 12N:
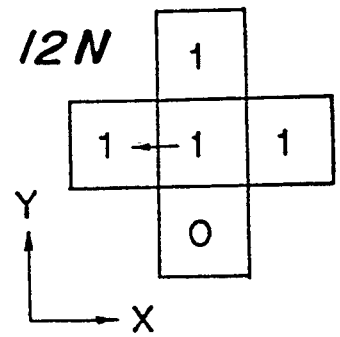
Figure 12Q:
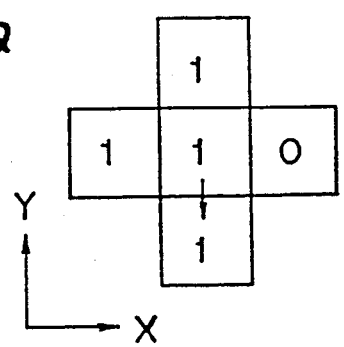
Figure 13:
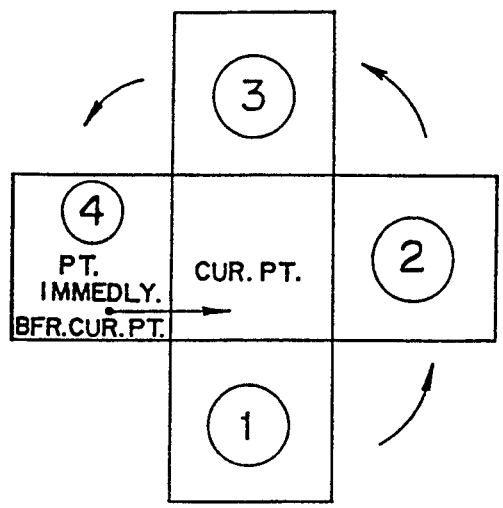
FIG. 13 is a descriptive view for describing the processing for finding the next point in boundary line processing according to the embodiment of the present invention.

First, at steps 100 and 101, the number of boundary lines (n$_b$) and the coordinate (x, y) of the data indicating sectional configuration are initialized to "0". According to the instruction of the MPU 1, the data indicating sectional configuration are sequentially read out from the memory 5. If it is decided at step 102 that the bit of the data of the coordinate (x, y) is "1", i.e., if it is decided that the object has a configuration at the coordinate (x, y), the program goes to step 103. If it is decided at step 102 that the bit is "0", i.e., if it is decided that the object does not have a configuration at the coordinate (x, y), the program goes to step 107. It is then decided at step 103 whether or not the coordinate (x, y) is the start point of the boundary line. That is, if the bit pattern in the vicinity of the coordinate (x, y) has the same bit pattern as that of any one of those of FIG. 12, this coordinate can be the start point of the boundary line. The arrows shown in FIG. 12 denote the initial moving direction of the processing for detecting boundary lines. A coordinate having the bit pattern shown in FIG. 12A is the start point as well as the termination point. When the next point (x', y') is searched and then found, the value of the point (x', y') is set to "2" at step 104 because the boundary line has passed through this point. Then, the following point is searched counterclockwise in the order of ①, ②, ③, and ④ as shown in FIG. 13. A point at which the bit is detected to be "1" or "2" initially in the processing for detecting boundary lines is the following point. Processing at steps 104 and 105 are repeated until the processing returns to the start point already detected. Thus, one closed boundary line is generated and "1" is added to ($n_b$) at step 106. Then, the next coordinate (x, y) is searched to generate the following boundary line.

Figure 14:
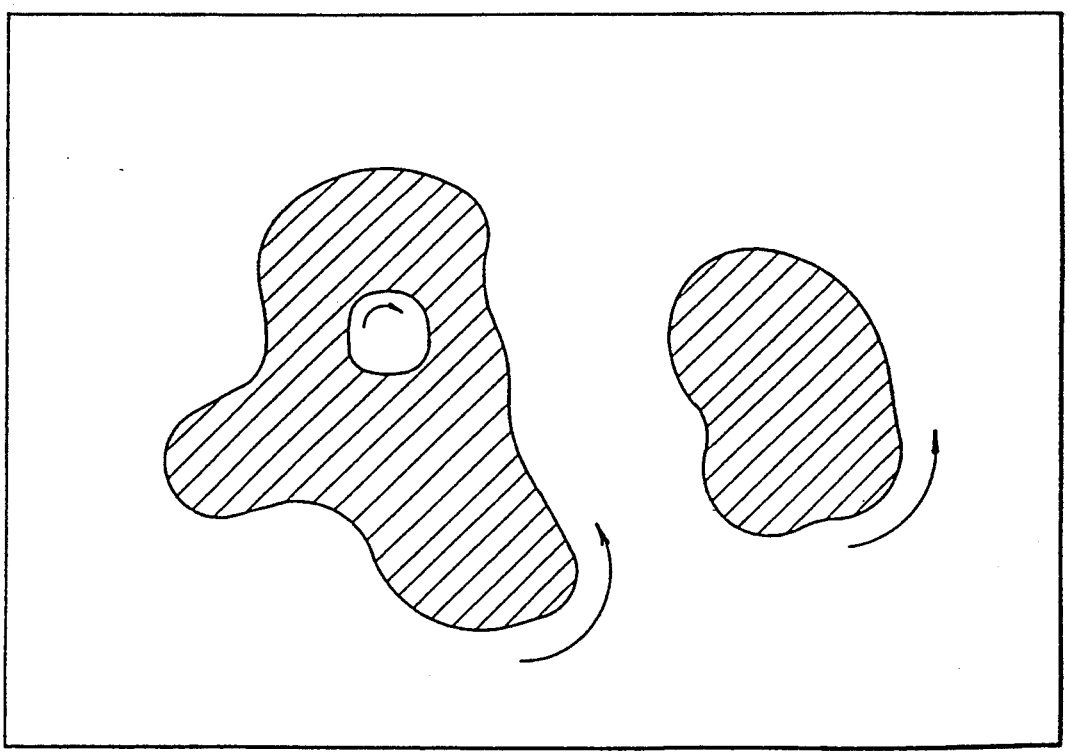
FIG. 14 is a sectional view for describing the direction of a boundary line according to the embodiment of the present invention.

The processing at steps 101 through 110 are executed for all data in the section (x, y). Thus, all boundary lines in the sectional view can be found. Therefore, the number of boundary lines ($n_b$) is found. The number of boundary lines ($n_b$) is stored in the memory 6. The direction of the boundary lines thus generated are counterclockwise as shown in FIG. 14.

The processing for generating mesh data based on the data indicating the characteristic of sectional configuration is described in detail below.

Figure 4A:
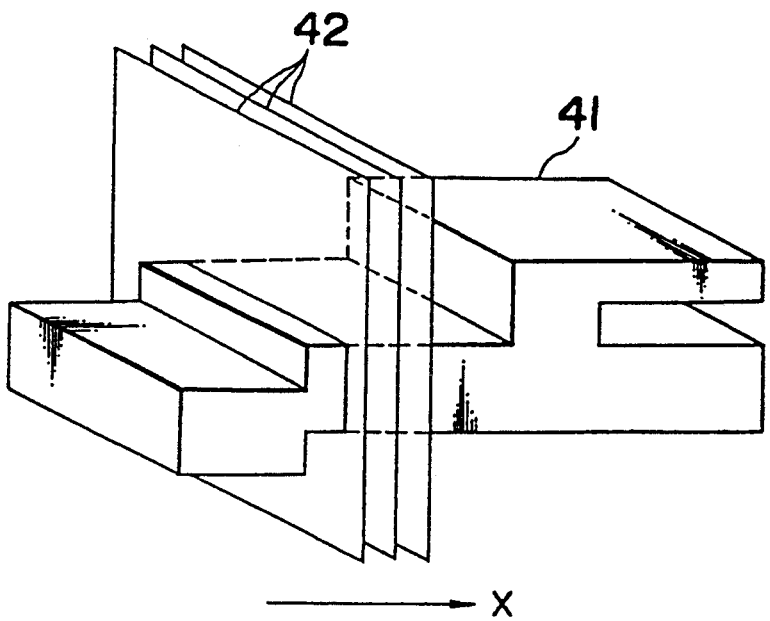
FIG. 4A and 4B are sectional views of a three-dimensional object.
Figure 4B:
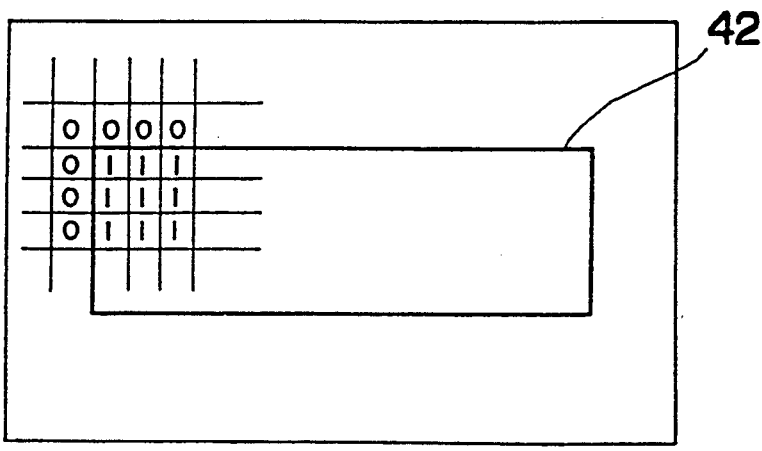
Figure 4C:
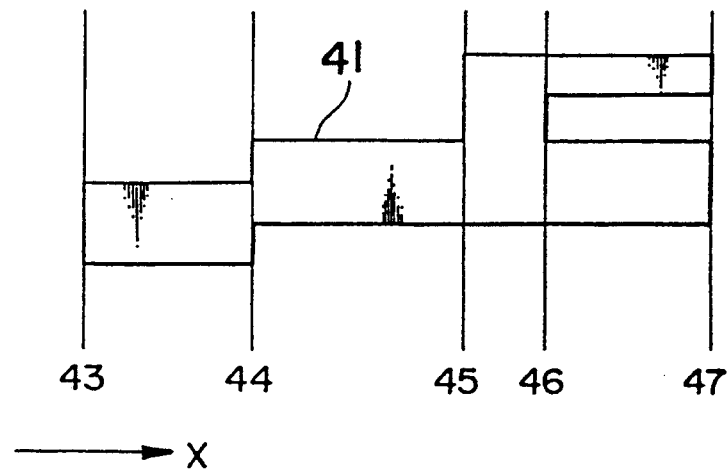
FIG. 4C is a descriptive view of a mesh plane.

As shown in FIG. 4C, a mesh plane is generated at a position, of the object, at which sectional configuration changes greatly. That is, for example, the mesh plane is generated in the following conditions.

1) When a sectional area changes greatly.
2) When the sign of the rate of change of sectional area changes.
3) When the center of gravity of the section changes greatly.
4) When topology of the section, namely, the number of boundary lines changes.

Mesh data is generated from a sectional area (S), a center of gravity ($x_g$, $y_g$) of a sectional view, and number ($n_b$) of boundary lines of sectional views which are data of sectional feature.

That is, in the sectional configuration 42 in FIG. 4A, if at least one expression of the following expressions is satisfied, the sectional configurations 42 are considered as mesh planes 43-47.

$$|S - S_-| \geq d_1 \quad (3)$$

$$(S_- < S) \wedge (S_+ \leq S) \quad (4\text{-}1)$$

$$(S_- = S) \wedge (S \neq S_+) \quad (4\text{-}2)$$

$$(S < S_-) \wedge (S \leq S_+) \quad (4\text{-}3)$$

$$\sqrt{(x_g - x'_g)^2 + (y_g - y'_g)^2} \geq d_2 \quad (5)$$

Here, the sectional area, center of gravity, and number of boundary lines of the current section (x) are (S), ($x_g$, $y_g$), and $n_b$. The sectional area, center of gravity, and number of boundary lines of the section (x−1) immediately before the current section (x) are ($S_-$), ($x'_g$, $y'_g$), and $n'_b$. The sectional area of the next section (x+1) is ($S_+$). Reference symbols $d_1$ and $d_2$ denote thresholds previously set.

The expressions (3), (4-1), (4-2), and (4-3) express the change of the sectional area. The expression (5) expresses the change of the center of gravity. The expression (6) expresses the change of the phase.

Figure 15:
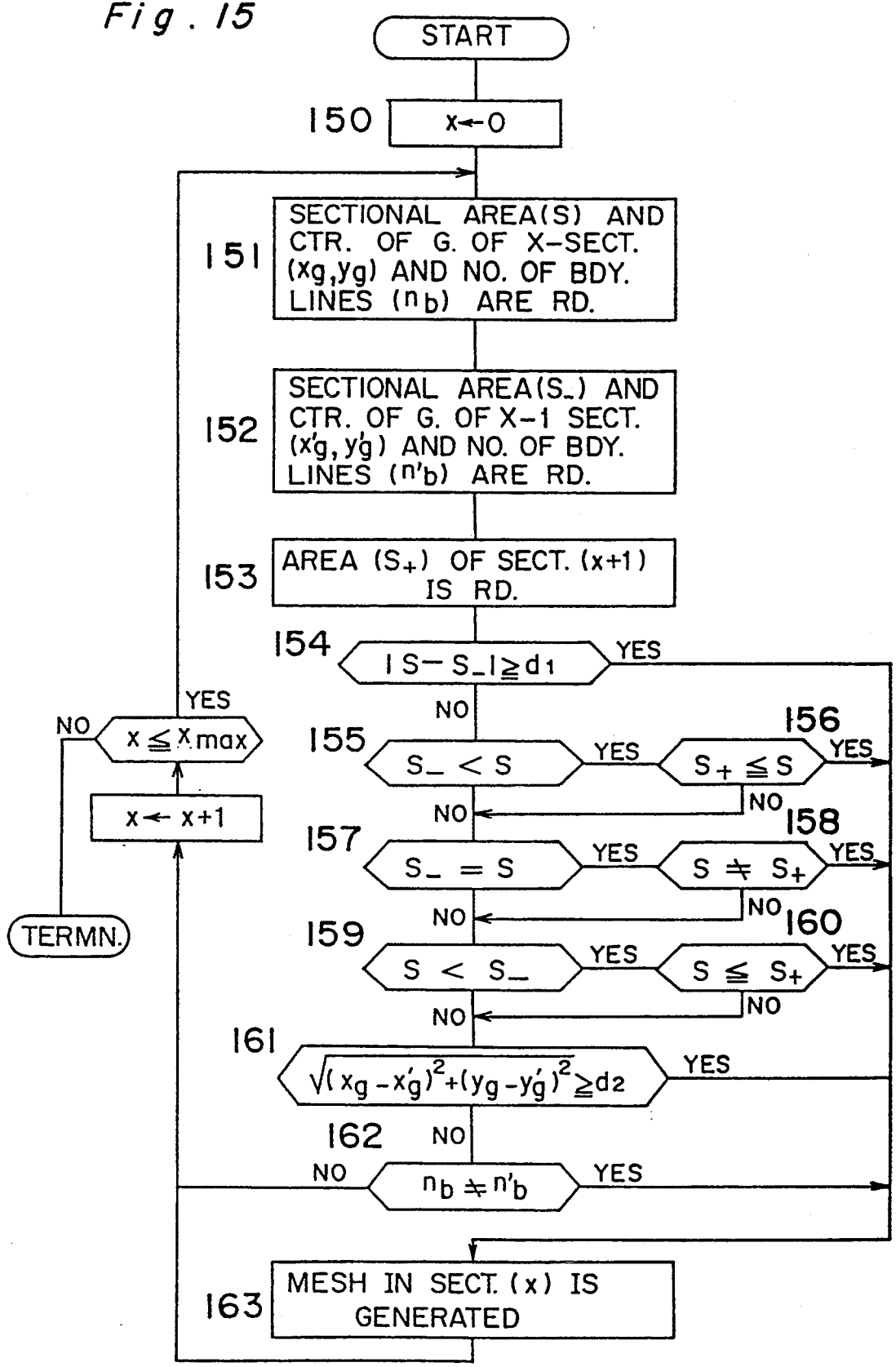
FIG. 15 is a flowchart for finding mesh data.

Accordingly, the flowchart of the processing for generating mesh data based on the data indicating the characteristic of sectional configuration is as shown in FIG. 15.

First, the x-coordinate of an x-section is set to "0" at step 150. Then, at steps 151 through 153, according to the instruction of the MPU 1, the following is sequentially read out from the memory 6: the sectional area (S) of the x-section, the center of gravity thereof ($x_g$, $y_g$), the number of boundary lines thereof ($n_b$); the sectional area ($S_-$) of the section (x−1) immediately before the current section, the center of gravity thereof ($x'_g$, $y'_g$), the number of boundary lines thereof ($n'_b$); and the sectional area ($S_+$) of the section (x+1) immediately after the current section. The MPU 1 decides the above evaluation equations (3) through (6) sequentially at steps 154 through 162 whether or not a mesh is generated in the x-section. If yes, at any one of the steps 154 through 162, a mesh is generated in the x-section and the data of the mesh is written into the mesh data memory 7 at step 163.

The above processing is executed at steps 151 through 163 for all x-sections.

Reference symbols $d_1$ and $d_2$ denote thresholds previously set. The interval of adjacent meshes and the number of meshes can be controlled by altering the thresholds $d_1$ and $d_2$.

A similar processing to that for X-section is executed for Y-section and Z-section. The structure of the mesh data memory 7 is as shown in FIG. 16. Reference symbols $n_x$, $n_y$, and $n_z$ shown in FIG. 16 denote the number of meshes in X-section, Y-section, and Z-section, respectively.

Figure 17:
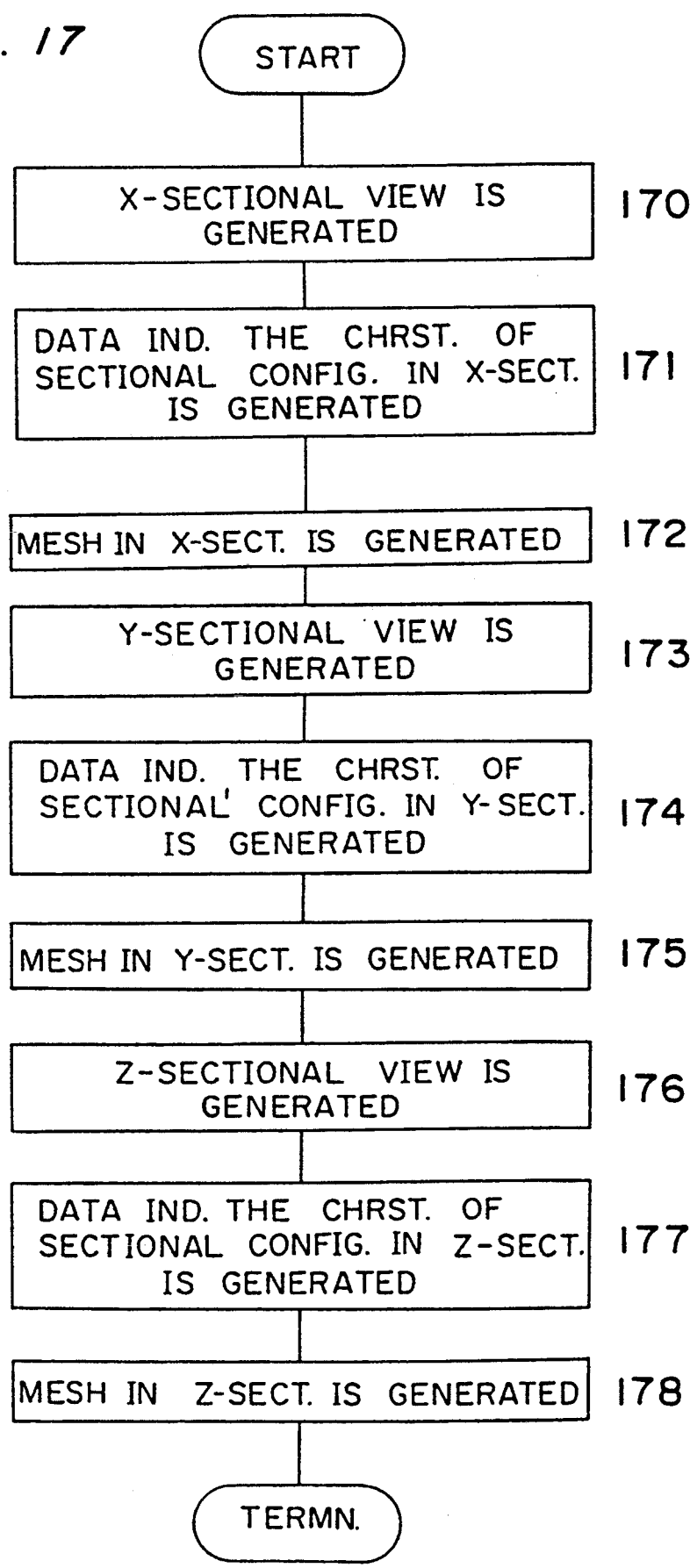
FIG. 17 is a flowchart showing the entire processing flow according to the first embodiment of the present invention.

The entire flow of this embodiment is shown in FIG. 17.

According to the instruction of the MPU 1, the run-length data, namely, the data of the configuration of the solid object is read out from the run-length data memory 4 and then the X-sectional view of the object is generated. The data is stored in the memory 5 at step 170. Then, the data indicating the sectional view of the object is read out from the memory 5 and then data indicating the characteristic of sectional configuration is generated and stored in the memory 6 at step 171.

The above processing at each step 170 and 171 is repeatedly executed for all (x) of the X-section ($0 \leq x \leq x_{max}$).

Then, at step 172, according to the instruction of the MPU 1, the data indicating the characteristic of sectional configuration of the object in X-section is read out from the memory 6 and processed. Meshes of X-section are sequentially generated and mesh data is recorded in the mesh data memory 7.

Similarly, processing is executed for Y-section and Z-section at steps 173, 174 and steps 176, 177, respectively.

Then, similarly, the mesh of Y-section and Z-section is generated at step 175 and 178, respectively.

A second embodiment is described in detail below. The second embodiment relates to a mesh generated in a cylindrical coordinate axis as shown in FIG. 18A.

Figure 18:
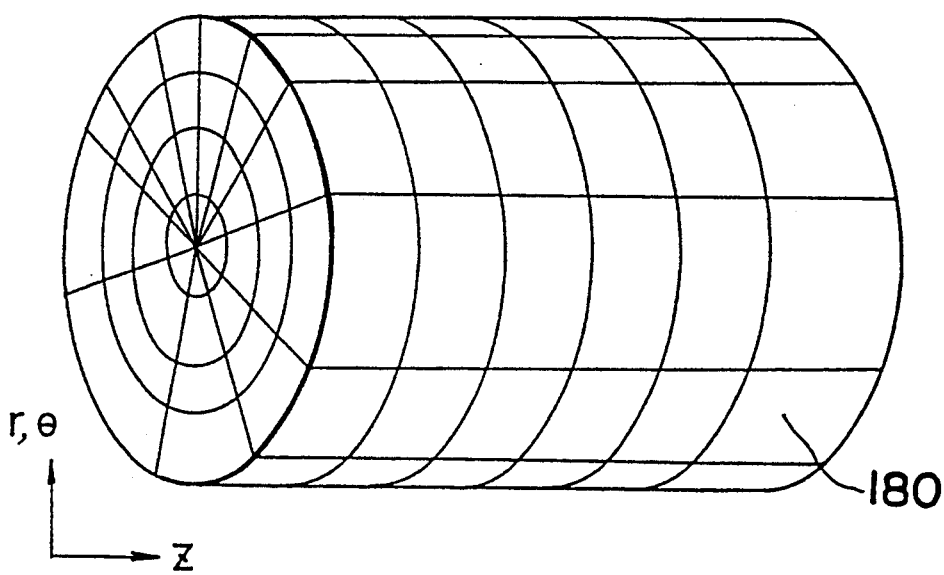
FIG. 18A is a descriptive view of a mesh generated in a cylindrical coordinate system.
FIG. 18B is a descriptive view of a mesh-divided cell in a cylindrical coordinate system.
FIGS. 18C and 18D are descriptive views of an intersection point between a cylindrical plane and run-length.
Figure 18:
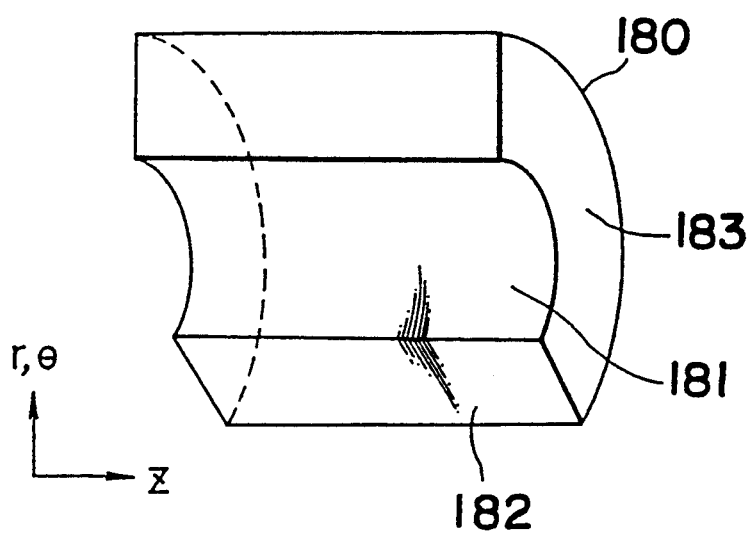

A mesh-divided cell is a fan-shaped column as shown in FIG. 18B. Accordingly, θ-section 182 and Z-section 183 are planes, so that processing of the second embodiment is identical to that of the first embodiment as far as these two sections are concerned. That is, in order to find sectional views, processing for checking whether or not straight lines (run-length data) intersect or fall on each sectional plane is executed.

However, r-section 181 is a cylindrical plane (curved plane), so that it is necessary to examine whether or not a circular arc 184 and a straight line 185. (run-length data) intersect with each other in order to find the sectional view, as shown in FIGS. 18C and 18D. That is, the sectional view is found by solving a quadratic equation, the calculation of which is very simple. Supposing that the origin is (0, 0, 0), the cylindrical plane of radius (r) is expressed as follows:

$$x^2 + y^2 \qquad (7)$$

The run-length data (straight line) on X-coordinate at a point x' is expressed as follows supposing that the run-length data is in Y-direction.

$$x = x', \; y_1 \leq y \leq y_2 \qquad (8)$$

Solving the above equations (7) and (8), the solution y' is expressed as follows:

$$y' = \pm \sqrt{r^2 - x^2} \qquad (9)$$

When $y_1 \leq y' \leq y_2$, intersection points of the circular arc 184 and the straight line 185 (run-length data) are generated. That is, according to the instruction of the MPU 1, the bit, of the memory 5, corresponding to the point at which the run-length data intersects or is on the-section is "1".

The r-sectional view of the object is found by repeating the above processing for all run-length data in the r-section. The subsequent processing is executed similarly to the above.

According to the above construction, meshes can be automatically generated by accurately detecting the variation of the sectional configuration of a three-dimensional object as example shown in FIG. 4.

Figure 2A:
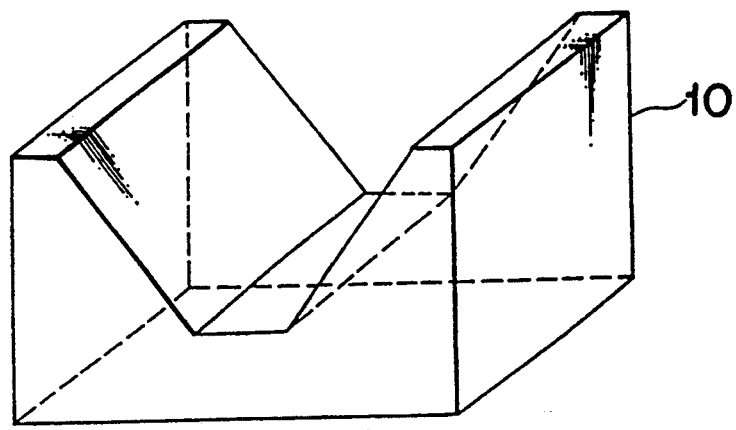
FIG. 2A shows an example of an obstruction in the fluid analyzing operation.
Figure 2B:
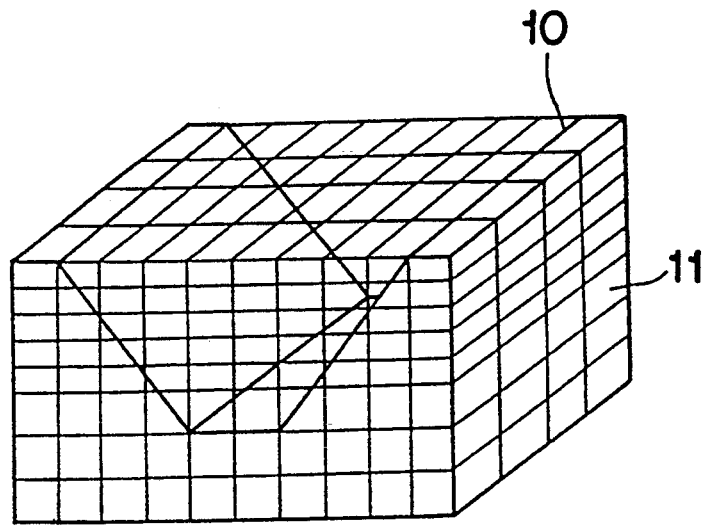
FIG. 2B shows an example of mesh-divided (lattice-divided) space in the fluid analyzing operation.
Figure 2C:
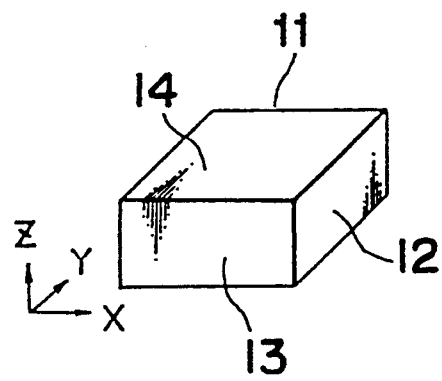
FIG. 2C is a descriptive view of a rectangular cell in a rectangular coordinate system.

That is, sectional configurations 42 in each of X-axis, Y-axis, and Z-axis are sequentially generated from run-length data which expresses the configuration 41 of the solid object. In FIG. 4A, sectional views in X-axis are sequentially generated. The configuration 41 of the object is expressed by a plurality of run-length data (lines). Therefore, the sectional configuration of the object can be found very easily by repeating calculations to check whether or not lines are on each sectional plane or intersect therewith. As a result, the sectional configuration 42 (sectional view) of the object is found by a pixel form (bit map) as shown in FIG. 2B.

Then, the characteristic variation of the sectional configuration of the object is detected from this sectional view. To this end, the sectional area, the center of gravity, and the number of boundary lines are found for all sectional views of each section. Calculations for finding these values can be easily performed because the sectional configuration is expressed in bit map data.

As shown in FIG. 4C, mesh planes 43 through 47 can be automatically generated according to the characteristic variation of the sectional configuration. Meshes 43, 45, 46, 47 can be found based on the change of the sectional area. Meshes 43, 44, 45, 56, 47 can be found based on the change of the center of gravity. Meshes 43, 46, 47 can be found based on the change of the number of boundary lines.

As described above, the configuration of the three-dimensional solid object is expressed by the three-dimensional run-length data. Therefore, a graphic processing allows mesh data to be generated from the data of the configuration of the solid object by repeating decisions on whether or not straight lines intersect with or fall on a plane in rectangular coordinate and whether or not straight lines intersect with a circular arc in cylindrical coordinate. The repeating processing is very simple. Thus, since this method is suitable for a computer processing, this method ensures an automatic mesh generation at a high speed and high reliability.

Further, the three-dimensional run-length expression facilitates an accurate approximation of a complicated configuration of a three-dimensional solid.

Figure 19:
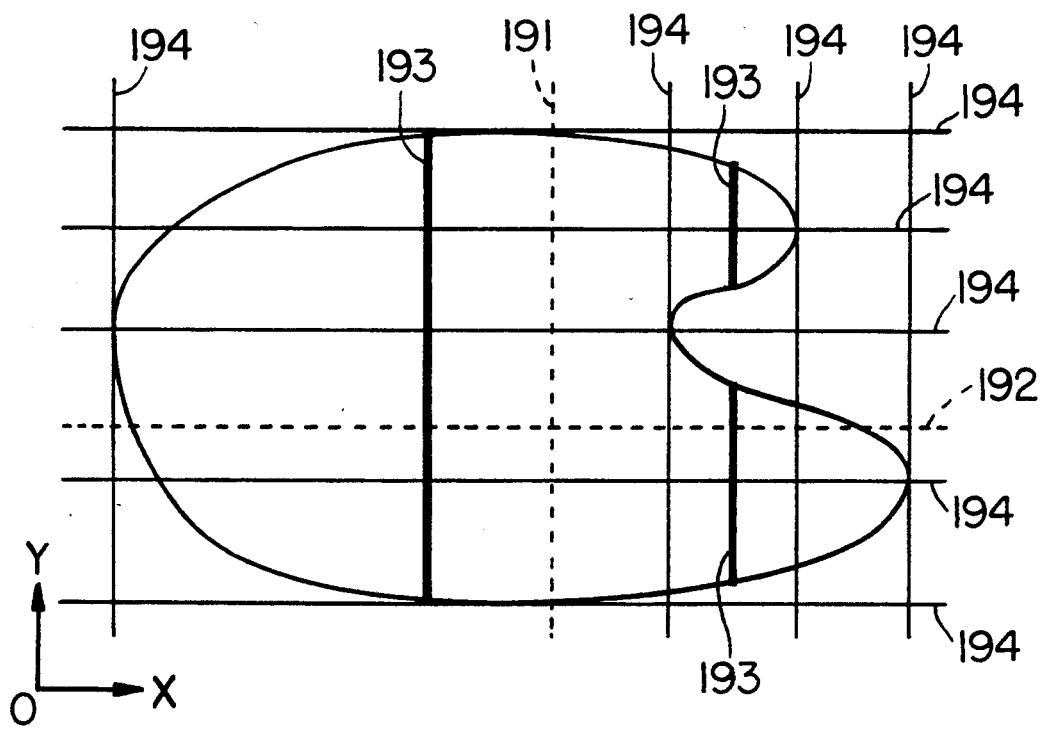
FIG. 19 is a sectional view for explaining the application of the invention to a second dimensional configuration.

The apparatus and method according to the present invention can be applied to a second dimensional configuration. In a case of the second dimensional configuration, the zmax in the Z coordinate is set to be "0" and thus any operation in the Z coordinate can not be performed. That is, in the second dimensional configuration, the sectional configurations 42 are sectional lines 191 and 192 shown in FIG. 19. Therefore, the x-sectional view is generated by finding a run-length 193 overlapped with the x-sectional line 191. The y-sectional view is generated by finding an intersection point between a y-sectional line 192 and the run-length 193.

Feature values of sectional views are found from the obtained sectional views. In the second dimension, since the sectional view is considered as a line segment, the following feature values are used: (1) total sum of the length of segments, (2) center of gravity of a segment, and (3) number of segments. These elements respectively correspond to area, center of gravity, and number of boundary lines in a three dimension. Mesh lines 194 are generated from the feature values. In this case, a mesh plane 43 is not generated.

However, graphic processing in a third dimension can be applied to graphic processing in such a second dimension. That is, when the x-section and y-section are processed, the length in the Z-coordinate is set to be "1" and processing of the z-sectional view is omitted.

To briefly summarize, a characteristic feature of the present invention in the three dimensional configuration is to express a three dimensional configuration in run-length data form, generate a sectional view from the data of the run-length, find a sectional view characteristic data (such as sectional area, center of gravity, and number of boundary lines) from the sectional view, and find a mesh plane from the data of the sectional view characteristic data.

A characteristic feature of the present invention in the two dimensional configuration is to express a two dimensional configuration in run-length data form, generate a sectional view from the data of the run-length, find a section view characteristic data (such as length of segments, center of gravity of segments, and number of segments) from the sectional view, and find a mesh line from the data of the sectional view characteristic data.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A mesh generating method comprising the steps of:
   forming three-dimensional run-length data representing a three-dimensional configuration of an object, and storing the run-length data in a run-length data storing device;
   sequentially reading out the run-length data from the storing device, processing the run-length data to generate plural sectional configuration data representing a configuration of the object at plural cross-sections of the object, respectively, and storing the plural sectional configuration data in a device for storing the sectional configuration data;

sequentially reading out the plural sectional configuration data from the device for storing the sectional configuration data, processing each sectional configuration data to generate characteristic data representing a characteristic of a corresponding cross-section of the object, the characteristic data including data denoting at least one of an area a center of gravity, and a number of boundary lines of the corresponding cross-section, and storing each characteristic data corresponding to each of the plural cross-sections of the object in a device for storing the characteristic data; and sequentially reading out the characteristic data from the device for storing the characteristic data, processing the characteristic data to generate mesh plane data of the object in accordance with the data denoting at least one of the area, the center of gravity and the number of sectional lines of the cross-sections of the object, and storing the mesh plane data in a mesh data storing device.

2. A mesh generating method as recited in claim 1, wherein the mesh plane data is generated in accordance with a change in at least one of the area, the center of gravity and the number of boundary lines from one cross-section of the object to an adjacent cross-section of the object.

3. A mesh generating apparatus comprising:

a first graphic processing device for forming three-dimensional run-length data representing a three-dimensional configuration of an object;

a run-length data storing data device for storing the run-length data;

a second graphic processing device for sequentially reading out the run-length data from the storing device, and processing the run-length data to generate sectional configuration data representing a configuration of the object at plural cross-sections of the object, respectively;

a device for storing the sectional configuration data;

a third graphic processing device for sequentially reading out the plural sectional configuration data from the device for storing the sectional configuration data, and processing each sectional configuration data to generate characteristic data representing a characteristic of a corresponding cross-section of the object, the characteristic data including data denoting at least one an area, a center of gravity, and a number of boundary lines of each corresponding cross-section;

a device for storing the data; and a fourth graphic processing device for sequentially reading out the characteristic data from the device for storing the characteristic data, and processing the characteristic data to generate mesh plane data of the object in accordance with the data denoting at least one of the area, the center of gravity and the number of sectional lines of the cross-sections of the object; and a mesh data storing device for storing the mesh plane data.

4. A mesh generating apparatus as recited in claim 3, wherein the fourth graphic data processing device generates the mesh plane data in accordance with a change in at least one of the area, the center of gravity and the number of boundary lines from one cross-section of the object to an adjacent cross-section of the object.

5. A mesh generating method comprising the steps of:

forming two-dimensional run-length data representing a two-dimensional configuration of an object, and storing the run-length data in a run-length data storing device;

sequentially reading out the run-length data from the storing device, processing the run-length data to generate plural sectional configuration data representing a configuration of the object at plural cross-sections of the object, respectively, and storing the plural sectional configuration data in a device for storing the sectional configuration data;

sequentially reading out the plural sectional configuration data from the device for storing the sectional configuration data, processing each sectional configuration data to generate characteristic data representing a characteristic of a corresponding cross-section of the object, the characteristic data including data denoting at least one of an area, a center of gravity, and a number of boundary lines of the corresponding cross-section, and storing each characteristic data corresponding to each of the plural cross-sections of the object in a device for storing the characteristic data; and sequentially reading out the characteristic data from the device for storing the characteristic data, processing the characteristic data to generate mesh plane data of the object in accordance with the data denoting at least one of the area, the center of gravity and the number of sectional lines of the cross-sections of the object, and storing the mesh plane data in a mesh data storing device.

6. A mesh generating method as recited in claim 5, wherein the mesh plane data is generated in accordance with a change in at least one of the area, the center of gravity and the number of boundary lines from one cross-section of the object to an adjacent cross-section of the object.

7. A mesh generating apparatus comprising:

a first graphic processing device for forming two-dimensional run-length data representing a two-dimensional configuration of an object;

a run-length data storing data device for storing the run-length data;

a second graphic processing device for sequentially reading out the run-length data from the storing device, and processing the run-length data to generate sectional configuration data representing a configuration of the object at plural cross-sections of the object, respectively;

a device for storing the sectional configuration data;

a third graphic processing device for sequentially reading out the plural sectional configuration data from the device for storing the sectional configuration data, and processing each sectional configuration data to generate characteristic data representing a characteristic of a corresponding cross-section of the object, the characteristic data including data denoting at least one an area, a center of gravity, and a number of boundary lines of each corresponding cross-section;

a device for storing the data; and a fourth graphic processing device for sequentially reading out the characteristic data from the device for storing the characteristic data, and processing the characteristic data to generate mesh plane data of the object in accordance with the data denoting at least one of the area, the center of gravity and the number of sectional lines of the cross-sections of the object; and a mesh data storing device for storing the mesh plane data.

8. A mesh generating apparatus as recited in claim 7, wherein the fourth graphic data processing device generates the mesh plane data in accordance with a change in at least one of the area, the center of gravity and the number of boundary lines from one cross-section of the object to an adjacent cross-section of the object.

* * * * *